US010275688B2

(12) United States Patent
Jiang (10) Patent No.: US 10,275,688 B2
(45) Date of Patent: Apr. 30, 2019

(54) OBJECT DETECTION WITH NEURAL NETWORK (71) Applicant: Nokia Technologies Oy, Espoo (FI)

(72) Inventor: Xiaoheng Jiang, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/535,280

(22) PCT Filed: Dec. 17, 2014

(86) PCT No.: PCT/CN2014/094033
§ 371 (c)(1),
(2) Date: Jun. 12, 2017

(87) PCT Pub. No.: WO2016/095117
PCT Pub. Date: Jun. 23, 2016

(65) Prior Publication Data
US 2017/0351936 A1 Dec. 7, 2017

(51) Int. Cl.
*G06K 9/00* (2006.01)
*G06K 9/62* (2006.01)
(Continued)

(52) U.S. Cl.
CPC ....... *G06K 9/6256* (2013.01); *G06K 9/00362* (2013.01); *G06K 9/4628* (2013.01);
(Continued)

(58) Field of Classification Search
CPC combination set(s) only.
See application file for complete search history.

(56) References Cited

U.S. PATENT DOCUMENTS 6,654,728 B1  11/2003  Li et al.
8,055,018 B2  11/2011  Han et al.
(Continued)

FOREIGN PATENT DOCUMENTS

CN   103279759 A   9/2013
CN   103366180 A   10/2013
(Continued)

OTHER PUBLICATIONS

Krizhevsky et al., "Imagenet Classification with Deep Convolutional Neural Networks", Proceedings of the 25th International Conference on Neural Information Processing Systems, vol. 1, Dec. 3-6, 2012, pp. 1-9.
(Continued)

*Primary Examiner* — Alex Kok S Liew
(74) *Attorney, Agent, or Firm* — Ditthavong & Steiner, P.C.

(57) ABSTRACT

According to an example aspect of the present invention, there is provided an apparatus comprising at least one processing core and at least one memory including computer program code, the at least one memory and the computer program code being configured to, with the at least one processing core, cause the apparatus at least to nm a convolutional neural network comprising an input layer arranged to provide signals to a first convolutional layer and a last convolutional layer, run a first intermediate classifier, the first intermediate classifier operating on a set of feature maps of the first convolutional layer, and decide to abort or to continue processing of a signal set based on a decision of the first intermediate classifier.

20 Claims, 6 Drawing Sheets (51) Int. Cl.
G06K 9/60 (2006.01)
G06K 9/46 (2006.01)
G06N 3/04 (2006.01)
G06K 9/78 (2006.01)

(52) U.S. Cl.
CPC .............. *G06K 9/60* (2013.01); *G06K 9/6267* (2013.01); *G06K 9/6282* (2013.01); *G06N 3/0454* (2013.01); *G06K 9/00805* (2013.01); *G06K 9/78* (2013.01); *Y04S 10/54* (2013.01)

(56) References Cited

U.S. PATENT DOCUMENTS

| | | | |
|---|---|---|---|
| 2007/0047802 A1 | 3/2007 | Puri | |
| 2010/0002920 A1* | 1/2010 | Cosatto | G06K 9/00147 382/128 |
| 2014/0079297 A1 | 3/2014 | Tadayon et al. | |
| 2014/0314271 A1 | 10/2014 | Xu et al. | |
| 2014/0355861 A1* | 12/2014 | Nirenberg | H04N 19/85 382/133 |
| 2015/0036920 A1* | 2/2015 | Wu | G06N 3/0454 382/156 |
| 2015/0347820 A1* | 12/2015 | Yin | G06K 9/00221 382/118 |

FOREIGN PATENT DOCUMENTS

| | | |
|---|---|---|
| CN | 103390164 A | 11/2013 |
| JP | H0484308 A | 3/1992 |
| JP | H1021406 A | 1/1998 |
| JP | 2003296737 A | 10/2003 |
| JP | 2008242638 A | 10/2008 |
| JP | 2010157118 A | 7/2010 |
| JP | 2011154580 A | 8/2011 |
| TW | 200304095 A | 9/2003 |

OTHER PUBLICATIONS

Girshick et al., "Rich Feature Hierarchies for Accurate Object Detection and Semantic Segmentation", Proceedings of the 2014 IEEE Conference on Computer Vision and Pattern Recognition (CVPR), Jun. 23-28, 2014, 8 pages.
Zeng et al., "Multi-Stage Contextual Deep Learning for Pedestrian Detection", IEEE International Conference on Computer Vision (ICCV), Dec. 1-8, 2013, pp. 121-128.
Sole, "Probabilistic Darwin Machines: A New Approach to Develop Evolutionary Object Detection Systems", Dissertation, Feb. 2009, 217 pages.
"Cascading Classifiers", Wikipedia, Retrieved on May 23, 2018, Webpage available at : https://en.wikipedia.org/wiki/Cascading_classfiiers.
Office action received for corresponding Japanese Patent Application No. 2017-523866, dated May 21, 2018, 5 pages of office action and 3 pages of translation available.
Jin et al., "Off-line Chinese Handwriting Recognition using Multistage Neural Network Architecture", IEEE International Conference on Neural Networks, Nov. 27-Dec. 1, 1995, 7 pages.
International Search Report and Written Opinion received for corresponding Patent Cooperation Treaty Application No. PCT/CN2014/094033, dated Dec. 17, 2014, 11 pages.
Extended European Search Report received for corresponding European Patent Application No. 14908152.3, dated Jul. 13, 2018, 7 pages.
Lee et al., "Deeply-Supervised Nets", Computer Vision and Pattern Recognition, Sep. 25, 2014, pp. 01-10.
Chippa et al., "Managing the Quality vs. Efficiency Trade-off Using Dynamic Effort Scaling", ACM Transactions on Embedded Computing Systems, vol. 12, No. 2s, May 2013, 23 pages.
Donahue et al., "DeCAF: A Deep Convolutional Activation Feature for Generic Visual Recognition", Proceedings of the 31st International Conference on Machine Learning, vol. 32, Oct. 2013, 9 pages.
Raykar et al., "Designing Efficient Cascaded Classifiers: Trade off between Accuracy and Cost", Proceedings of the 16th ACM SIGKDD International Conference on Knowledge Discovery and Data Mining, Jul. 25-28, 2010, pp. 853-860.
Cavalcanti et al., "MLPBoost: A Combined AdaBoost / Multi-Layer Perceptron Network Approach for Face Detection", IEEE International Conference on Systems, Man, and Cybernetics (SMC), Oct. 14-17, 2012, pp. 2350-2353.

\* cited by examiner

OBJECT DETECTION WITH NEURAL NETWORK

RELATED APPLICATION

This application was originally filed as Patent Cooperation Treaty Application No. PCT/CN2014/094033 filed Dec. 17, 2014.

FIELD OF INVENTION

The present invention relates to detecting objects using a computational network.

BACKGROUND OF INVENTION

Machine learning is a discipline that explores the design of algorithms that can learn from data. Machine learning algorithms adapt to inputs to build a model, and can then be used on new data to make predictions. Machine learning has ties to statistics, artificial intelligence and optimization, and is often employed in tasks where explicit rule-based algorithms are difficult to formulate. Examples of such tasks include optical image recognition, character recognition and email spam filtering.

Artificial neural networks are computational tools capable of machine learning. In artificial neural networks, which will be referred to as neural networks hereinafter, interconnected computation units known as "neurons" are allowed to adapt to training data, and subsequently work together to produce predictions in a model that to some extent resembles processing in biological neural networks.

Neural networks may comprise a set of layers, the first one being an input layer configured to receive an input. The input layer comprises neurons that are connected to neurons comprised in a second layer, which may be referred to as a hidden layer. Neurons of the hidden layer may be connected to a further hidden layer, or an output layer.

In some neural networks, each neuron of a layer has a connection to each neuron in a following layer. Such neural networks are known as fully connected networks. The training data is used to let each connection to assume a weight that characterizes a strength of the connection. Some neural networks comprise both fully connected layers and layers that are not fully connected. Fully connected layers in a convolutional neural network may be referred to as densely connected layers.

In some neural networks, signals propagate from the input layer to the output layer strictly in one way, meaning that no connections exist that propagate back toward the input layer. Such neural networks are known as feed forward neural networks. In case connections propagating back toward the input layer do exist, the neural network in question may be referred to as a recurrent neural network.

Convolutional neural networks, CNN, are feed-forward neural networks that comprise layers that are not fully connected. In CNNs, neurons in a convolutional layer are connected to neurons in a subset, or neighbourhood, of an earlier layer. This enables, in at least some CNNs, retaining spatial features in the input.

SUMMARY OF THE INVENTION

The invention is defined by the features of the independent claims. Some specific embodiments are defined in the dependent claims.

According to a first aspect of the present invention, there is provided an apparatus comprising at least one processing core and at least one memory including computer program code, the at least one memory and the computer program code being configured to, with the at least one processing core, cause the apparatus at least to run a convolutional neural network comprising an input layer arranged to provide signals to a first convolutional layer and a last convolutional layer, run a first intermediate classifier, the first intermediate classifier operating on a set of feature maps of the first convolutional layer, and decide to abort or to continue processing of a signal set based on a decision of the first intermediate classifier.

Various embodiments of the first aspect may comprise at least one feature from the following bulleted list:

- the convolutional neural network comprises a second convolutional layer between the first convolutional layer and the last convolutional layer, and a second intermediate classifier which operates on a set of feature maps of the second convolutional layer, and the apparatus is configured to decide to abort or to continue processing of the signal set based on a decision of the second intermediate classifier
- the convolutional neural network comprises a third convolutional layer between the second convolutional layer and the last convolutional layer, and a third intermediate classifier which operates on a set of feature maps of the third convolutional layer, and the apparatus is configured to decide to abort or to continue processing of the signal set based on a decision of the third intermediate classifier
- the set of feature maps of the first convolutional layer comprises a subset of all feature maps of the first convolutional layer
- the set of feature maps of the second convolutional layer comprises a subset of all feature maps of the second convolutional layer
- the set of feature maps of the third convolutional layer comprises a subset of all feature maps of the third convolutional layer
- the signal set comprises a processed sub-image of an image from the input layer
- the signal set comprises a processed version of an image from the input layer
- the convolutional neural network is configured to detect an image of a person
- the convolutional neural network is configured to detect an image of a pedestrian
- the apparatus is configured to select at least one of the set of feature maps of the first convolutional layer, the set of feature maps of the second convolutional layer and the set of feature maps of the third convolutional layer based on at least one criterion.

According to a second aspect of the present invention, there is provided method comprising running a convolutional neural network comprising an input layer arranged to provide signals to a first convolutional layer and a last convolutional layer, running a first intermediate classifier, the first intermediate classifier operating on a set of feature maps of the first convolutional layer, and deciding to abort or to continue processing of a signal set based on a decision of the first intermediate classifier.

Various embodiments of the second aspect may comprise at least one feature corresponding to a feature from the preceding bulleted list laid out in connection with the first aspect.

According to a third aspect of the present invention, there is provided an apparatus comprising means for running a convolutional neural network comprising an input layer arranged to provide signals to a first convolutional layer and a last convolutional layer, means for running a first intermediate classifier, the first intermediate classifier operating on a set of feature maps of the first convolutional layer, and means for deciding to abort or to continue processing of a signal set based on a decision of the first intermediate classifier.

According to a fourth aspect of the present invention, there is provided a non-transitory computer readable medium having stored thereon a set of computer readable instructions that, when executed by at least one processor, cause an apparatus to at least run a convolutional neural network comprising an input layer arranged to provide signals to a first convolutional layer and a last convolutional layer, run a first intermediate classifier, the first intermediate classifier operating on a set of feature maps of the first convolutional layer, and decide to abort or to continue processing of a signal set based on a decision of the first intermediate classifier.

According to a fifth aspect of the present invention, there is provided a computer program configured to cause a method in accordance with the second aspect to be performed.

INDUSTRIAL APPLICABILITY

At least some embodiments of the present invention find industrial application in enhancing machine-based pattern recognition.

DETAILED DESCRIPTION OF EXAMPLE EMBODIMENTS

By allowing an intermediate classifier to abort processing image data before it is provided further in a convolutional neural network, processing load in analysing pattern data is reduced. The intermediate classifier may operate on feature maps of a preceding convolutional layer. Multiple intermediate classifiers may be used, each operating on feature maps of a preceding layer, wherein each intermediate classifier operates on feature maps of a different convolutional layer.

Figure 1:
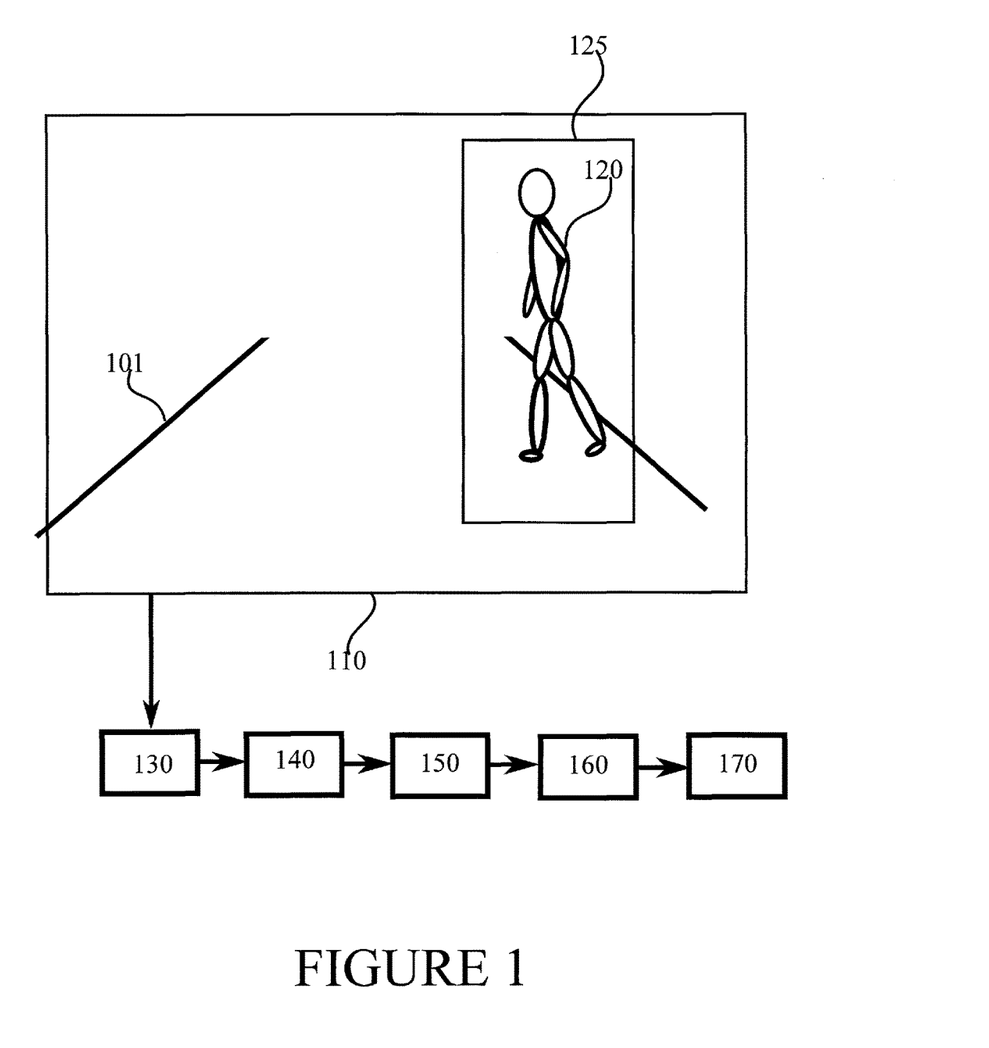
FIG. 1 illustrates an example system capable of supporting at least some embodiments of the present invention.

FIG. 1 illustrates an example system capable of supporting at least some embodiments of the present invention. FIG. 1 has a view 110 of a road 101, on which a pedestrian 120 is walking. While described herein in connection with detecting pedestrians, the invention is not restricted thereto, but as the skilled person will understand, the invention is applicable also more generally to pattern recognition in visual, auditory or other kind of data. For example, handwriting recognition, facial recognition, traffic sign recognition, voice recognition, language recognition, sign language recognition and/or spam email recognition may benefit from the present invention, depending on the embodiment in question.

In FIG. 1, road 101 is imaged by a camera 130. Camera 130 is configured to capture a view 110 that covers the road at least in part. Camera 130 may be configured to pre-process image data obtained from an image capture device, such as a charge-coupled device, CCD, comprised in camera 130. Examples of pre-processing include reduction to black and white, contrast adjustment and brightness balancing to increase a dynamic range present in the captured image. In some embodiments, the image data is also scaled to a bit depth suitable for feeding into an image recognition algorithm. Pre-processing may include selection of an area of interest, such as area 125, for example, for feeding into the image recognition algorithm. Pre-processing may be absent or limited in nature, since one benefit of CNNs is that in general input data need not be extensively pre-processed before providing it to the CNN. Camera 130 may be installed, for example, in a car that is configured to drive itself. Alternatively, camera 130 may be installed in a car designed to be driven by a human driver, but to provide a warning and/or automatic braking if the car appears to be about to hit a pedestrian or animal.

Data is provided from camera 130 to a convolutional neural network, which comprises phases 140, 150, 160 and 170. Phase 140 comprises a first convolutional layer, which is configured to process the image received from camera 130. First convolutional layer 140 may comprise a plurality of kernels, each kernel being arranged to process data from one section of the image received from camera 130. The section of the image provided to a kernel may be referred to as the receptive field of the kernel. An alternative term for a kernel is a filter. Receptive fields of neighbouring kernels may overlap to a degree, which may enable the convolutional neural network to respond to objects that move in the image. In some embodiments, the kernels first convolutional layer 140 employ the same weights, meaning that while weights may differ between neurons comprised in a kernel, kernel weight tables are the same for each kernel of first convolutional layer 140. This reduces the number of independent weights and causes the convolutional neural network to process different sections of the image in a similar way. In, for example, pedestrian detection, this may be useful since a pedestrian may be present in any part of the image. Controlling the number of independent weights may also provide the advantage that training the convolutional neural network is easier.

First convolutional layer 140 has a plurality of feature maps. Intermediate classifier 150 may receive the feature maps, or be enabled to read the feature maps from first convolutional layer 140. Intermediate classifier 150 may use all feature maps of first convolutional layer 140 or only a subset of them. A subset in this regard means a set that comprises at least one, but not all, of the feature maps of first convolutional layer 140. Intermediate classifier 150 may be configured to decide that no pedestrian is in the image, or in a sub-image, and to prevent further processing of the image data in second convolutional layer 160. This has the effect of conserving computational resources.

In some embodiments, intermediate classifier 150 is arranged to decide to prevent further processing of image data that corresponds to a subset of the kernels of first convolutional layer 140. For example, even if a pedestrian is present in view 110, the image of the pedestrian may cover only a small section of view 110, for example area 125. The rest may be referred to as background. In this case, processing data further from kernels that do not receive signals from area 125 would not contribute to an eventual decision as to whether view 110 comprises a pedestrian, rather only the kernel or kernels that do receive signals from area 125 will contribute to that decision. In this sense, area 125 may be considered a sub-image of view 110, with view 110 comprising also other sub-images, each sub-image corresponding to a receptive field of a kernel. Alternatively or additionally, an area of the image that one kernel receives signals from may be considered a sub-image. Intermediate classifier 150 may be said to be arranged to prevent further processing of background sub-images.

Intermediate classifier 150 may be constructed to enable it to decide on further processing of image data. For example, it may be constructed to operate on characteristics of feature maps of first convolutional layer 140. Using only a subset of the feature maps of first convolutional layer 140, as noted above, conserves computational resources. During constructing the intermediate classifier, it may become apparent which feature maps of first convolutional layer 140 have the highest distinguishing ability, and these feature maps may be selected for intermediate classifier 150 to operate on.

In intermediate classifier 150, the selected feature maps of first convolutional layer 140 may be arranged into a decision tree. This may comprise cascading them into a degenerate decision tree, for example, to produce the intermediate classifier.

Image data for which intermediate classifier 150 does not prevent further processing is provided to second convolutional layer 160. Second convolutional layer 160 may comprise a plurality of kernels arranged to accept outputs of first convolutional layer 140, and to further process the image data. In detail, each kernel may be arranged to process data from one or more kernels of first convolutional layer 140. The part of first convolutional layer 140 that provides signals to a kernel of second convolutional layer 160 may be referred to as the receptive field of that kernel of second convolutional layer 160. Receptive fields of neighbouring kernels of second convolutional layer 160 may overlap to a degree, which may enable the convolutional neural network to respond to objects that move in the image. In some embodiments, the kernels of second convolutional layer 160 employ the same weights, meaning that while weights may differ between neurons comprised in a kernel, kernel weight tables are the same for each kernel of second convolutional layer 160. This reduces the number of individual weights and causes the convolutional neural network to process different sections of the image in the same way.

First convolutional layer 140 and second convolutional layer 160 may be enabled to learn different levels of representation, wherein higher and lower level concepts are handled in different layers. Therefore, first convolutional layer 140 and second convolutional layer 160 may be capable of describing objects in different perspectives or aspects. This enables, in some embodiments, evaluating sub-images in different conceptual layers and discriminating them in an earlier stage than the final decision. In other words, earlier classifiers, or judges, may exclude sub-images that do not contain target patterns so that later layers need look at a smaller quantity of data.

Phase 170 of the CNN of FIG. 1 is a decision layer, which may comprise, for example, a fully connected layer. In the example of FIG. 1, an output of the decision layer is a determination as to whether a pedestrian is comprised in view 110.

Although described above in terms of first convolutional layer 140 and second convolutional layer 160, in other embodiments of the invention there may be present further at least a third convolutional layer. In such a case, a second intermediate classifier may also be present, which is arranged to operate on feature maps of second convolutional layer 160. The second intermediate classifier may then prevent further processing of some background sub-images that intermediate classifier 150 let pass into second convolutional layer 160. An advantage of such an arrangement is that decision layer 170 receives even fewer background sub-images, than in the case where only one intermediate classifier is used.

Camera 130 and the CNN of FIG. 1 may be comprised, for example, in a mobile device, such as, for example, a mobile phone, smartphone or other similar mobile device. The mobile device may be attachable to a car, to enable warning a driver of the car in case a pedestrian may be ahead.

In some embodiments, camera 130 and the CNN are not comprised in the same apparatus. For example, camera 130 may be comprised in a car or a mobile device, and camera 130 may be arranged to provide, at least in part, and/or in processed and/or compressed form, its video feed to a CNN that runs in a backend server device, or a computer of the car. The server may provide indications of decisions it makes back to the car or mobile device, for example.

In some embodiments, CNN layers, such as for example first convolutional layer 140 and second convolutional layer 160, are comprised in different apparatuses. For example, a first apparatus may comprise camera 130 and first convolutional layer 140, while a second apparatus may be configured to run second convolutional layer 160. In principle, a third apparatus might run intermediate classifier 150. The first, second and/or third apparatuses may comprise mobile devices, for example, or alternatively at least one of them may comprise a backend server, for example. Where at least two of the first, second and third apparatuses comprise mobile devices, they may be arranged to communicate with each other, for example via a near-field communication interface, such as NFC or Bluetooth, for example.

Figure 2:
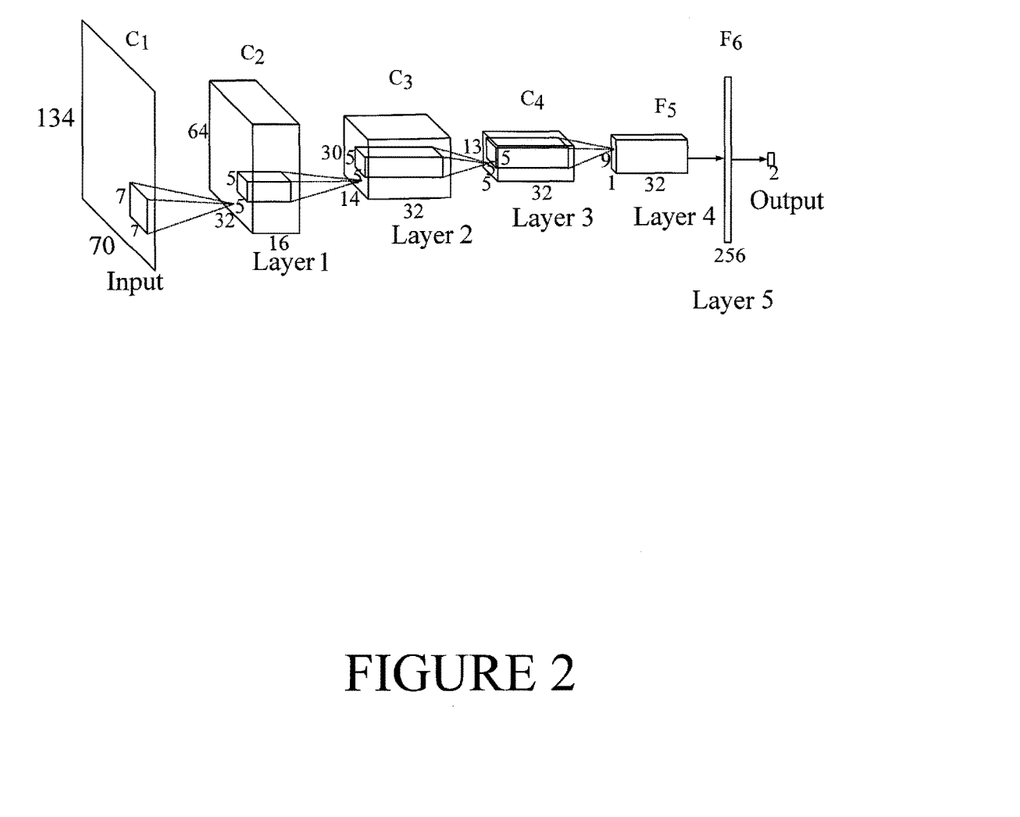
FIG. 2 illustrates an example CNN in accordance with at least some embodiments of the present invention.

FIG. 2 illustrates an example CNN in accordance with at least some embodiments of the present invention. The example CNN comprises six layers, denoted in FIG. 2 as $C_1$, $C_2$, $C_3$, $C_4$, $F_5$ and $F_6$. The layers titled "C" are convolutional layers and the layers titled "F" are fully connected layers. In other words, the last two layers are fully connected and the first four layers are convolutional. The output of the last layer is a two-way judgement which produces confidences corresponding to pedestrian and background, respectively.

In the illustrated example, local contrast normalization operation follows the first three convolutional layers. Subsampling operation follows the local normalization operation.

In the illustrated example, the first convolutional layer, Input, filters the 134×70×1 input image with 16 kernels of size 7×7×1 with a stride of 1 pixel. The second convolutional layer takes as input the output of the first convolutional layer, which may be normalized and subsampled, for example. The second convolutional layer, Layer 1, filters its input with 32 kernels of size 5×5×16. The third convolutional layer, Layer 2, has 32 kernels of size 5×5×32 connected to the outputs of the second convolutional layer, which may also be normalized and subsampled, for example. The fourth convolutional layer, Layer 3, has kernels of size of 5×5×32. The fully-connected layer has 256 neurons. The CNN of FIG. 2 uses subsampling to decrease layer dimensions toward the decision stage.

Figure 3:
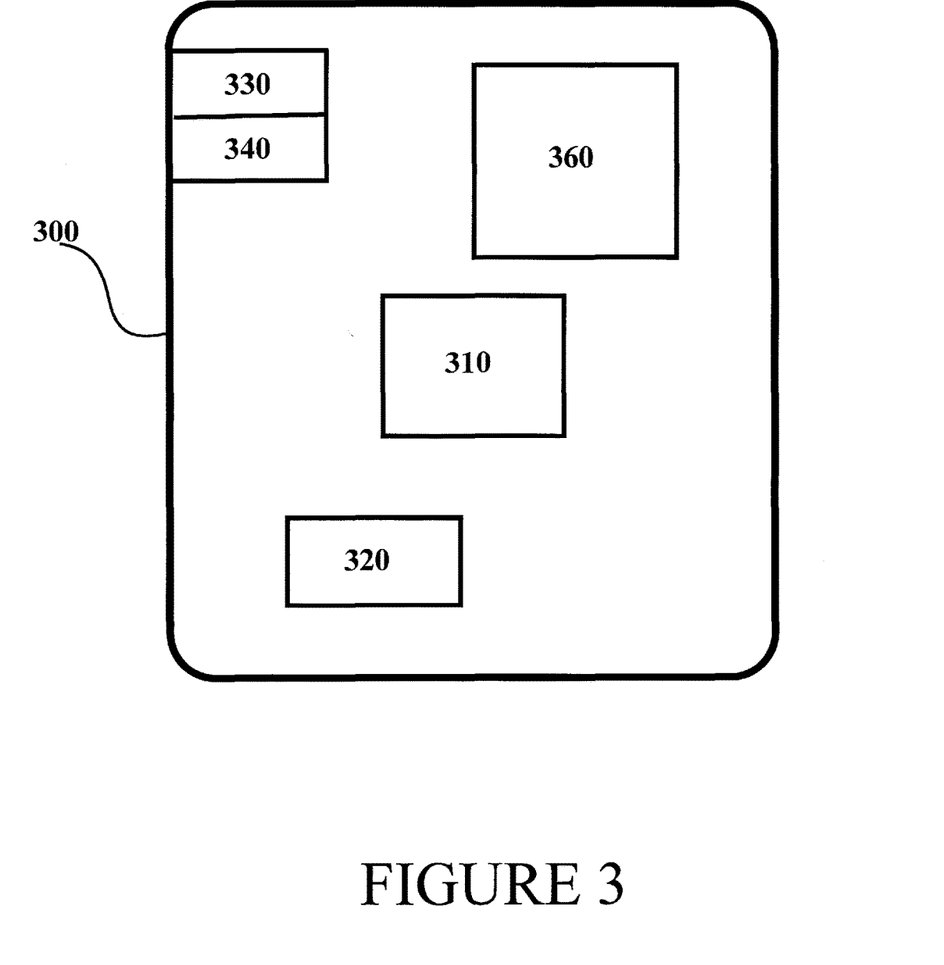
FIG. 3 illustrates an example apparatus capable of supporting at least some embodiments of the present invention.

FIG. 3 illustrates an example apparatus capable of supporting at least some embodiments of the present invention, for example by running a CNN with at least one intermediate classifier. Illustrated is device 300, which may comprise, for example, a computer or computing device. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Brisbane processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance WLAN, Ethernet, wideband code division multiple access, WCDMA, and/or worldwide interoperability for microwave access, WiMAX, standards, for example.

Device 300 may comprise user interface, UI, 360. UI 360 may comprise at least one of a display, a keyboard and a touchscreen. A user may be able to operate device 300 via UI 360, for example to configure an artificial neural network.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. Device 300 may comprise a fingerprint sensor arranged to authenticate, at least in part, a user of device 300. In some embodiments, device 300 lacks at least one device described above.

Processor 310, memory 320, transmitter 330, receiver 340 and/or, UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
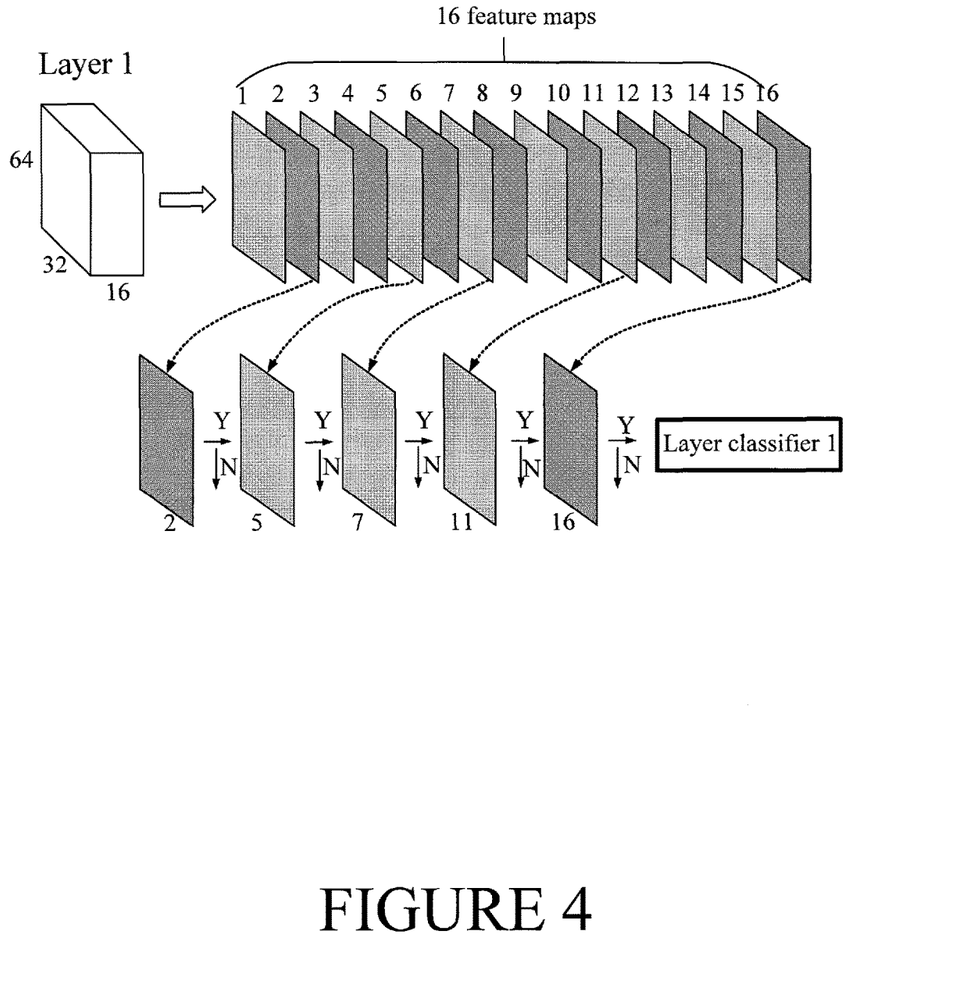
FIG. 4 illustrates an example intermediate classifier in accordance with at least some embodiments of the present invention.

FIG. 4 illustrates an example intermediate classifier in accordance with at least some embodiments of the present invention. The example intermediate classifier is based on layer 1 of the example of FIG. 2. This layer has 16 feature maps of size 64×32. Here, each feature map itself is one form of representation of the input image, so we can use each feature map to train a classifier. For example, the 64×32=2048 elements of one feature map may be concatenated into one vector. A support vector machine, SVM, or multilayer perceptron, MLP, classifier may be trained, for example. In the example of FIG. 4, an SVM classifier is described. In total, in this example we get 16 linear SVMs which may be ranked according to their classification error. To conserve computation resources, the top 5 SVMs having the most distinguishing ability may be selected to construct the intermediate layer classifier 1.

Next, the ranking of the trained SVMs is briefly described. Given a sample x, a SVM classifier $h_i(x, w_i)$ for feature $f_i(x)$ (the vector obtained from the i-th feature map) is defined as $$h_i(x, w_i) = \begin{cases} 1 & \langle f_i(x), w_i \rangle \geq th_i; \\ 0 & \langle f_i(x), w_i \rangle < th_i. \end{cases} \quad (1)$$

where $th_i$ is a threshold obtained during the training process. Then, the weighted classification error for each SVM classifier may be calculated. The best one with the minimal classification error may be first selected, and the weights of training samples then be re-computed in the next iteration. The selection procedure may be repeated until all the SVM classifiers are chosen.

The number of SVMs constructing a layer classifier can be determined as follows: The layer classifier should filter out about, for example, 60% or 70% of the background image windows surviving from the former layer, whereas letting all the input image windows containing a pedestrian, or more generally a target pattern, pass through. The ranked SVMs may be cascaded into a degenerate decision tree one by one until this requirement is satisfied, and then the number of SVMs can be obtained. Likewise, we can get intermediate layer classifiers 2, 3 and 4 based on feature maps of Layer 2, Layer 3 and Layer 4, respectively, of FIG.

2. Finally, the original CNN with one single decision may be changed into a CNN with layer-by-layer decisions, as will be shown in FIG. 5.

In other words, a plurality of intermediate classifiers may be constructed, each of the intermediate classifiers operating on feature maps of the convolutional layer preceding the intermediate classifier. Each of the intermediate classifiers may be arranged to prevent further processing of data that does not contain a pattern sought by the CNN, to obtain the effect that computational resources are conserved. Operating on a subset of feature maps of the respective preceding convolutional layer may further conserve computational resources. Depending on the CNN architecture, layers in the convolutional neural network may comprise tens or even hundreds of feature maps, wherefore selecting the most discrimination-capable ones may provide, depending on the architecture, a moderate or very high level of computational resource conservation.

Figure 5:
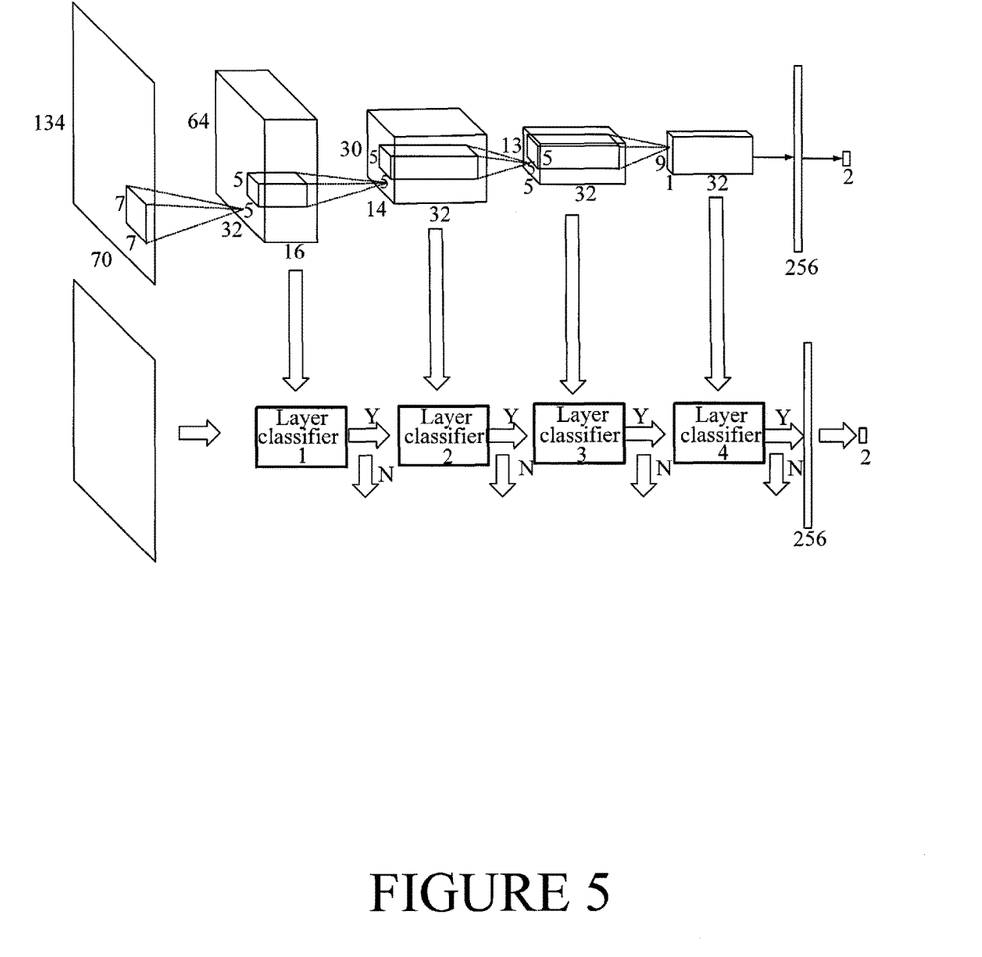
FIG. 5 illustrates layer-by-layer decision in a CNN in accordance with at least some embodiments of the present invention.

FIG. 5 illustrates layer-by-layer decision in a CNN in accordance with at least some embodiments of the present invention. In the system of FIG. 5, a CNN similar to that of FIG. 2 is furnished with four intermediate classifiers. The structure of Layer classifier 1, operating on feature maps of Layer 1, was illustrated in FIG. 4.

In the illustrated system, the intermediate classifiers: layer classifier 1, layer classifier 2, layer classifier 3 and layer classifier 4 are each configured to prevent further processing of 70% of background material, that is, parts of the input image that do not comprise a pedestrian. As a result, only $(1-0.7)^4 = 0.8\%$ of background sub-images remain to be evaluated in the output layer. In testing using the INRIA (pedestrian) dataset, processing speed has been increased by a factor of 5.2 as compared to a similar CNN without intermediate decisions.

Although described herein as comprising an intermediate classifier between each convolutional layer, in some embodiments fewer intermediate classifiers are provided. For example, in the system of FIG. 5, having only the first intermediate classifier, that is, the layer 1 classifier, would already provide a computational benefit over a CNN lacking intermediate decisions, since even a single intermediate classifier reduces the quantity of background material in the later stages of the CNN. Alternatively, in the system of FIG. 5, only Layer classifier 1 and Layer classifier 2 could be used.

Figure 6:
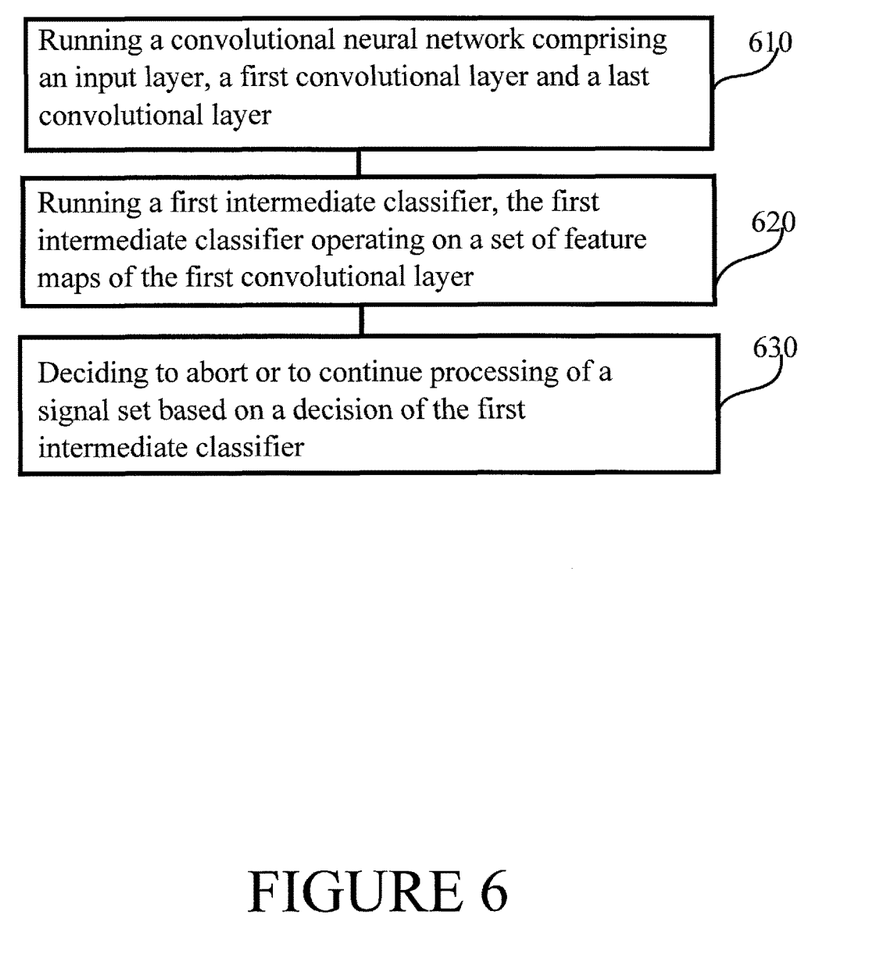
FIG. 6 is a flow chart of a method in accordance with at least some embodiments of the present invention.

FIG. 6 is a flow chart of a method in accordance with at least some embodiments of the present invention. The phases of the illustrated method may be performed in a device such as device 300 of FIG. 3, for example.

Phase 610 comprises running a convolutional neural network comprising an input layer arranged to provide signals to a first convolutional layer and a last convolutional layer. Phase 620 comprises running a first intermediate classifier, the first intermediate classifier operating on a set of feature maps of the first convolutional layer. The first intermediate classifier may be run between the first convolutional layer and the last convolutional layer, for example. Finally, phase 630 comprises deciding to abort or to continue processing of a signal set based on a decision of the first intermediate classifier. The signal set may comprise a sub-image, for example, or more generally a subset, such as for example a filtered subset, of an input provided to the convolutional neural network.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus comprising at least one processor and at least one memory including computer program code for one or more programs, the at least one memory and the computer program code being configured to, with the at least one processor, cause the apparatus to perform at least the following:

run a convolutional neural network comprising an input layer arranged to provide signals to a first convolutional layer and a last convolutional layer, wherein the first convolutional layer has a plurality of feature maps;

determine one support vector machine for a respective one of the feature maps;

run training data via the support vector machine to determine respective classification error performance of the respective feature map;

rank the feature maps based on the respective classification error performance;

reconstruct the first intermediate classifier using a number of the feature maps of the first convolutional layer with top ranking, wherein the number is bigger than one and smaller than a total number of the feature maps of the first convolutional layer; and decide to abort or to continue processing of a signal set based on a decision run via the reconstructed first intermediate classifier.

2. The apparatus according to claim 1, wherein the convolutional neural network comprises a second convolutional layer between the first convolutional layer and the last convolutional layer, and a second intermediate classifier which operates on a set of feature maps of the second convolutional layer, and the apparatus is configured to decide to abort or to continue processing of the signal set based on a decision of the second intermediate classifier.

3. The apparatus according to claim 2, wherein the convolutional neural network comprises a third convolutional layer between the second convolutional layer and the last convolutional layer, and a third intermediate classifier which operates on a set of feature maps of the third convolutional layer, and the apparatus is configured to decide to abort or to continue processing of the signal set based on a decision of the third intermediate classifier.

4. The apparatus according to claim 1, wherein the apparatus is further configured to: concatenate elements of the respective feature map into one vector as the support vector machine.

5. The apparatus according to claim 2, wherein the set of feature maps of the second convolutional layer comprises a subset of all feature maps of the second convolutional layer.

6. The apparatus according to claim 3, wherein the set of feature maps of the third convolutional layer comprises a subset of all feature maps of the third convolutional layer.

7. The apparatus according to claim 1, wherein the signal set comprises a processed sub-image of an image from the input layer.

8. The apparatus according to claim 1, wherein the signal set comprises a processed version of an image from the input layer.

9. The apparatus according to claim 1, wherein the convolutional neural network is configured to detect an image of a person.

10. The apparatus according to claim 9, wherein the convolutional neural network is configured to detect an image of a pedestrian.

11. The apparatus according to claim 3, wherein the apparatus is configured to select at least one of the set of feature maps of the first convolutional layer, the set of feature maps of the second convolutional layer and the set of feature maps of the third convolutional layer based on at least one criterion.

12. A method comprising:
running a convolutional neural network comprising an input layer arranged to provide signals to a first convolutional layer and a last convolutional layer, wherein the first convolutional layer has a plurality of feature maps;
determining one support vector machine for a respective one of the feature maps;
running training data via the support vector machine to determine respective classification error performance of the respective feature map;
ranking the feature maps based on the respective classification error performance;
reconstructing the first intermediate classifier using a number of the feature maps of the first convolutional layer with top ranking, wherein the number is bigger than one and smaller than a total number of the feature maps of the first convolutional layer; and
deciding to abort or to continue processing of a signal set based on a decision run via the reconstructed first intermediate classifier.

13. The method according to claim 12, wherein the convolutional neural network comprises a second convolutional layer between the first convolutional layer and the last convolutional layer, and a second intermediate classifier which operates on a set of feature maps of the second convolutional layer, and the method comprises deciding to abort or to continue processing of the signal set based on a decision of the second intermediate classifier.

14. The method according to claim 13, wherein the convolutional neural network comprises a third convolutional layer between the second convolutional layer and the last convolutional layer, and a third intermediate classifier which operates on a set of feature maps of the third convolutional layer, and the method comprises deciding to abort or to continue processing of the signal set based on a decision of the third intermediate classifier.

15. The method according to claim 12, wherein the apparatus is further configured to: concatenate elements of the respective feature map into one vector as the support vector machine.

16. The method according to claim 13, wherein the set of feature maps of the second convolutional layer comprises a subset of all feature maps of the second convolutional layer.

17. The method according to claim 14, wherein the set of feature maps of the third convolutional layer comprises a subset of all feature maps of the third convolutional layer.

18. The method according to claim 12, wherein the signal set comprises a processed sub-image of an image from the input layer.

19. A non-transitory computer readable storage medium carrying one or more sequences of one or more instructions which, when executed by one or more processors, cause an apparatus to at least perform the following steps:
running a convolutional neural network comprising an input layer arranged to provide signals to a first convolutional layer and a last convolutional layer, wherein the first convolutional layer has a plurality of feature maps;
determining one support vector machine for a respective one of the feature maps;
running training data via the support vector machine to determine respective classification error performance of the respective feature map;
ranking the feature maps based on the respective classification error performance;
reconstructing the first intermediate classifier using a number of the feature maps of the first convolutional layer with top ranking, wherein the number is bigger than one and smaller than a total number of the feature maps of the first convolutional layer; and
deciding to abort or to continue processing of a signal set based on a decision run via the reconstructed first intermediate classifier.

20. The apparatus according to claim 1, wherein the apparatus is further configured to: cascade the number of the feature maps of the first convolutional layer into a decision tree as the reconstructed first intermediate classifier.

* * * * *